Patented Oct. 23, 1928.

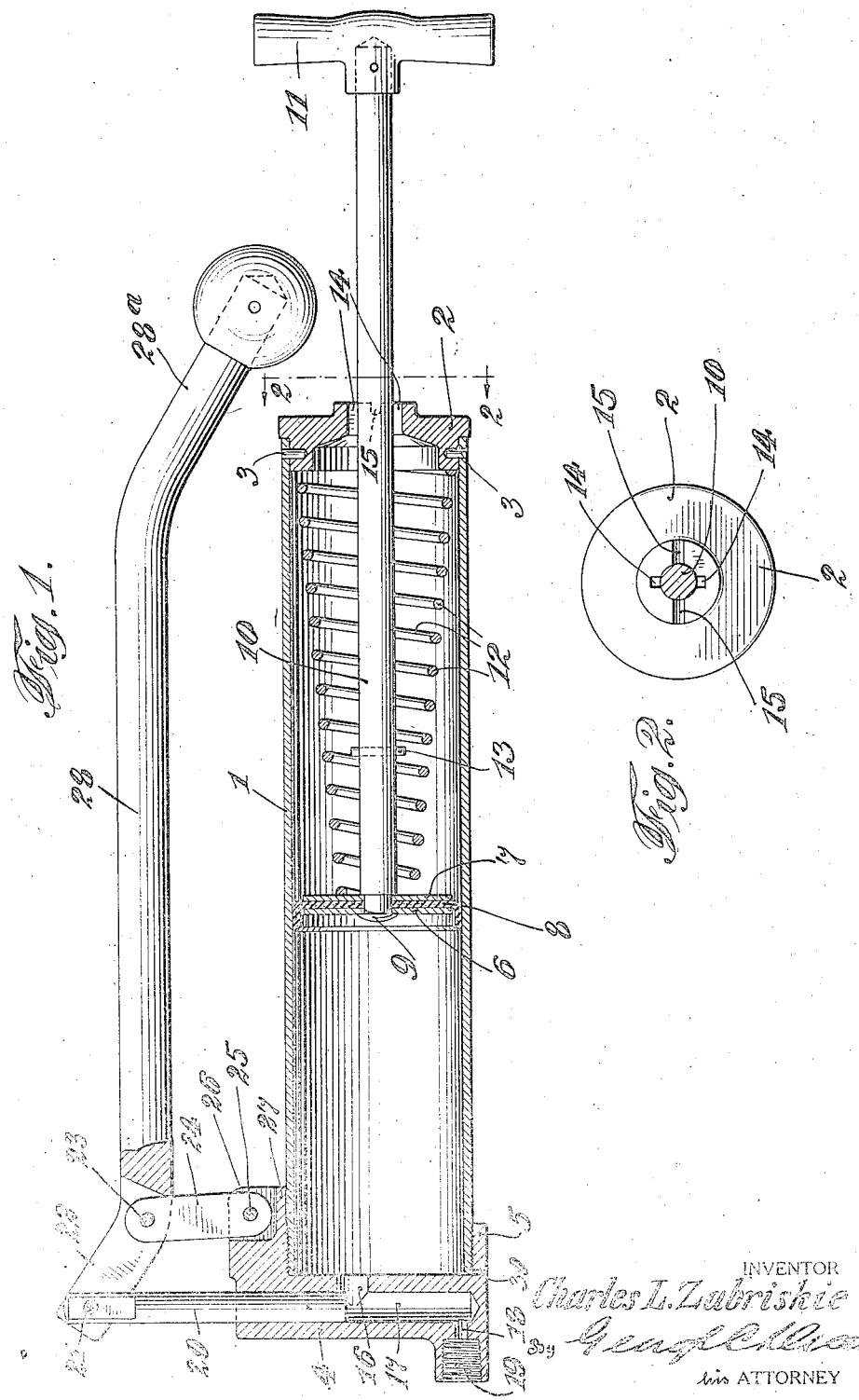

1,689,186

UNITED STATES PATENT OFFICE.

CHARLES L. ZABRISKIE, OF NEW YORK, N. Y., ASSIGNOR, BY MESNE ASSIGNMENTS, TO ROGERS PRODUCTS CO., INC., A CORPORATION OF NEW JERSEY.

LUBRICATING DEVICE.

Application filed January 27, 1926. Serial No. 84,101.

My present invention is shown as embodied in a device primarily designed for use as a hand operated grease gun for forcing grease through the ducts of bearings on automobiles and other machinery, particularly in cases where the duct inlets are normally closed by ball inlet check valves, as in recently expired British patent to Alley and Woodvine, No. 21,893, of 1906, Oct. 4.

More specifically considered, the object is to combine in a relatively small hand-operated grease gun, the features of force feed reservoir adapted to be charged with enough grease for lubricating many ducts, in combination with a plunger pump through the intake of which the reservoir discharges at moderate pressure, the pump being conveniently located for hand operation whenever the reservoir pressure is insufficient to overcome resistance encountered. This resistance is often great, as where the check valve fittings or ducts have become clogged with hardened grease or dirt. Without exceeding the sizes and proportions recognized as convenient for such purposes, I have produced a hand operated grease gun wherein the reservoir pressure may be 25 pounds to 50 pounds per square inch more or less, while the pressure readily available by hand operation of the pump may be up to 2500 pounds per square inch or more.

A practically important detail of the device is that the grease reservoir is in the form of a cylinder of considerable length, the pump handle is of the same or slightly greater length, and the fulcrum with the lever is arranged in such relation to the pump plunger and to the operating handle, that the force stroke of the pump plunger is accomplished by a separating movement of the reservoir cylinder, which will be grasped by the left hand, and the pump handle, which will be grasped by the right hand, or vice versa.

The above and other features of my invention will be more evident from the following description in connection with the accompanying drawings, in which—

Fig. 1 is a longitudinal section in a plane including the axis of the reservoir and also the axis of the pump chamber; and Fig. 2 is a detail section on the line 2—2, Fig. 1.

The reservoir comprises the cylinder, 1, closed, preferably permanently, by flange closing plug, 2, secured by pin rivets, 3, 3. The other end of the reservoir cylinder is closed by fitting, 4, having an internally screw-threaded flange, 5, engaged by an exterior thread on the end of the cylinder 1.

The means for applying pressure on the grease in the cylinder is shown as comprising a piston, which may consist simply of discs, 6, 7, between which is clamped the body portion of a cup washer, 8, as by riveting the head, 9, of the piston guide-rod, 10, which extends through the rear closure, 2, and may be provided with a handle, 11. The piston may have pressure applied to it in any desired way, as by spiral spring, 12, the resilience of which will be designed to normally force the piston to the extreme position where all of the grease has been expelled through the fitting, 4. Preferably, the piston rod, 10, is provided with a cross-pin, 13, adapted to be withdrawn through slots, 14, to fully retract the piston against the pressure of the spring. The piston and spring may be held in a retracted position by rotating the rod, 10, to bring the pin, 13, out of registry with slots, 14, and, if desired, notches, 15, may be formed in a boss in the rear end of closure, 2, in which the pin, 13, may be seated and held from displacement by the pressure of the compressed spring. In this position, the handle, 11, may be used as a wrench to unscrew the cylinder from the fitting, 4. Grease may be then charged in through the open end of the detached cylinder, and thereafter the cylinder may be again screwed to position and the piston released by rotating the rod, 10, to permit the pins to pass through the slots, 14, under the influence of the spring, 12. Thereafter, the spring will apply substantial pressure for feeding the grease and this may be supplemented by further hand pressure through the handle, 11. In the position of parts shown in the drawings, grease under such pressure will flow freely through pump intake, 16, into pump cylinder, 17, and out through pump outlet, 18, for discharge through any suitable coupling member that may be screwed into the nozzle, 19. Such reservoir feed of grease may be stopped at any time either by advancing the pump plunger, 20, until the inlet port, 16, is covered thereby or by retracting the piston as described above.

The plunger, 20, is connected by pivot, 21, with fork lever arm, 22, fulcrumed on pivot, 23, link, 24, and pivot, 25, by which the link is secured between suitable guiding faces, 26, in an extension, 27, of fitting, 4. The long power arm of the lever, 28, preferably has its hand grasp end, 28ª, curved toward the reservoir cylinder, 1, so that as the plunger approaches the end of a feeding stroke, said handle becomes more nearly parallel with the cylinder which forms a cooperating hand grasp for forcibly reciprocating the pump. In practice, I find that it is of great advantage to have the high power forcing movement of the pump such that it may be applied by pulling the end of the handle, 28, away from the end of cylinder, 1. It will be found in practice that much greater power can be applied by such a "pull apart movement" than where the operator has to apply the power by forcing his hands toward each other. There is the further advantage that "pull-apart" stresses are naturally diametric and have no tendency to produce a rotary resultant, whereas attempts to apply great pressure by pushing one hand toward the other hand, frequently results in getting the opposing pressures enough out of line with each other so that a very sudden and extreme rotation of the handle about the axis of the coupling at 19 is caused, thus unscrewing or loosening the detachable coupling through which the grease pressure takes effect.

It is to be noted that while the detachable coupling may be a rigidly projecting nozzle screwed directly into outlet 19, I prefer to have it on the end of a flexible metallic hose.

The vent, 30, at the base of the screw flange, 5, is adapted to be opened by unscrewing the cylinder, 1, a short distance, say, one or two threads, and can be completely sealed again by screwing the cylinder back to the position shown in Fig. 1. The air trapped in the grease in cylinder 1 can easily be forced out through the vent, 30, with little or no loss of grease, and the operation is automatically accomplished by the pressure of the spring whenever the cylinder, 1, is unscrewed the turn or two necessary to uncover the vent, 30.

I claim:—

1. In combination, a grease supplying cylinder, a pump cylinder extending transversely of said supply cylinder, an outlet from the supply cylinder into said pump cylinder, a single acting pump plunger within said pump cylinder, a lever handle extending along the supply cylinder and pivoted to the pump plunger, and a fulcrum for said lever on said supply cylinder, between the plunger pivot and the handle end of the lever, whereby the handle is pulled away from the supply cylinder, on expulsive movement of the plunger.

2. In combination, a grease supplying cylinder, a pump cylinder extending transversely of said supply cylinder, an outlet from the supply cylinder leading into the pump cylinder, means for forcing grease from the supply cylinder into the pump cylinder, a single acting pump plunger within the pump cylinder, a lever handle extending along the supply cylinder and pivoted to the plunger, and a fulcrum for said lever on the supply cylinder, between the plunger pivot and the handle end, whereby the handle is pulled away from the container on expulsive movement of the plunger.

3. A portable greasing device comprising a cylindrical grease container, a pump cylinder extending transversely of said container, a single acting pump plunger within said pump cylinder, a pump handle extending along the container and pivoted at one end to the plunger, a fulcrum for the handle positioned between the plunger pivot and the other end of the handle, an outlet from the container leading into the pump cylinder at a point adjacent the outstroke position of the plunger, and an outlet from the pump cylinder at a point adjacent the instroke position of the plunger, whereby flow of grease from the container to the pump cylinder is cut off when the handle is positioned away from the container.

4. A portable greasing device comprising a cylindrical grease container, a pump cylinder extending transversely of said container, a single acting pump plunger within said pump cylinder, a pump handle extending along the container and pivoted at one end to the plunger, a fulcrum for the handle positioned between the plunger pivot and the other end of the handle, an outlet from the container leading into the pump cylinder at a point adjacent the outstroke position of the plunger, means for forcing grease from the container into the pump cylinder, and an outlet from the pump cylinder adjacent the instroke position of the plunger, whereby flow or grease from the container to the pump cylinder is cut off when the handle is positioned away from the container.

Signed at New York, in the county of New York, and State of New York, this 26th day of January, A. D. 1926.

CHARLES L. ZABRISKIE.